June 4, 1968   W. H. EGLI   3,386,290
CONTROL APPARATUS

Filed Feb. 25, 1965   2 Sheets-Sheet 1

INVENTOR.
WERNER H. EGLI
BY Ronald T. Reiling
ATTORNEY

June 4, 1968     W. H. EGLI     3,386,290
CONTROL APPARATUS

Filed Feb. 25, 1965     2 Sheets-Sheet 2

INVENTOR.
WERNER H. EGLI
BY *Ronald T. Reiling*
ATTORNEY

United States Patent Office 3,386,290
Patented June 4, 1968

3,386,290
CONTROL APPARATUS
Werner H. Egli, Minneapolis, Minn., assignor to Honeywell Inc., Minneapolis, Minn., a corporation of Delaware
Filed Feb. 25, 1965, Ser. No. 435,786
6 Claims. (Cl. 73—505)

The present invention is related to apparatus for impedance matching of fluid devices, and more specifically, to apparatus for impedance matching of a fluid apparatus to a fluid amplifier. Impedance matching is defined in fluid technology as the process of connecting a fluid output passage of a fluid device to the fluid input passage of another fluid device to minimize the attenuation of a fluid signal traveling between the two devices.

Prior art devices for impedance matching of fluid apparatus consisted of using only the available fluid control stream from a sensing device to drive a subsequent stage of amplification, consequently size limitations were placed on subsequent stages of amplification. The applicant's device uses a secondary fluid source and a restrictive means connected so as to impedance match the two fluid devices. For purposes of illustration, the invention will be described as applied to a fluid vortex rate sensor having an airfoil pickoff means and a fluid amplifier, although the invention is by no way limited to this particular application.

A vortex rate sensor is a fluid sensing device that senses angular velocity about its input axis and provides a signal which is proportional to that angular velocity. The vortex rate sensor employs a fluid flow field which closely approximates the classical two dimensional pure sink flow in the absence of an input rate, that is, the fluid flowing within the vortex rate chamber has an inward radial velocity. If the vortex rate sensor is subjected to a rate (angular velocity) input in its sensitive axis, a vortex flow having only a tangential velocity is superimposed upon the sink flow field. The superimposing of the vortex flow field upon the sink flow field results in a flow field in which the fluid streamlines within the vortex rate sensor approximate a logarithmic spiral. The fluid then exhausts through the sink in a helical flow pattern.

In order to satisfy the equation of continuity, the radial velocity of the fluid will increase as the fluid flows into the sink outlet passage of the vortex rate sensor. To satisfy the principle of conservation of angular momentum the tangential velocity must increase as the radial distance from the exit passages becomes smaller. Thus, a fluid particle entering at the periphery of the rate sensor will continually accelerate until it exits out through the vortex sink outlet passage. It is this amplification of the fluid velocity that provides meaningful information about the angular rate applied to the vortex rate sensor.

A pickoff means is located in the sink outlet passage of the vortex rate sensor. An airfoil pickoff will be illustrated in the present embodiment to measure the output signal, although the present invention is by no means limited to an airfoil pickoff. For example a static or Pitot tube inserted in sink exit would also work with applicant's invention. A suitable pickoff means is disclosed in the Patent 3,340,737, filed Sept. 4, 1961, in the name of Richard J. Reilly, and assigned to the same assignee as the present invention.

The airfoil pickoff has a cross-section similar to the classical streamlined airfoil. The airfoil pickoff is inserted in the exit of the vortex rate sensor parallel to the input axis of the rate sensor. With an applied angular velocity to the rate sensor, the fluid flowing out the exit passage has a helical flow pattern. The helical flow pattern means that the fluid streamlines will be bent as they pass around the airfoil pickoff. The bending of the fluid streamlines tends to cause particles following that path to move faster than a particle following a shorter streamline between two points. According to Bernoulli's equation, the faster traveling particle will have a lower pressure associated with its streamline. Thus, a pressure differential exists across the airfoil which is proportional to the input rate applied to the vortex rate sensor.

A fluid amplifier having a power nozzle and two control ports for deflecting a fluid stream as it exits from the power nozzle is the device that is to be impedance matched to the rate sensor. The fluid amplifier is of the type that utilizes the momentum exchange between fluid streams to achieve its characteristics, although this type of amplifier need not be used with applicant's invention, a turbulence amplifier or vortex amplifier could equally be impedance matched. Basically, the fluid amplifier has a jet of fluid emanating from a power nozzle, and has two control ports located perpendicular to the power nozzle which deflect the power nozzle stream in one direction or the other. Since momentum must be preserved in this type of interaction between two streams, the stream is deflected to one output leg or the other, or in the case of a proportional amplifier, only a proportion of the fluid power stream is deflected.

The impedance matching apparatus contains a fluid resistance means, which may be a sintered piece of metal, an orifice, or any other device that has a presure drop across itself when fluid flows through it. The fluid resistor limits the amount of flow in the various passages and, as will be shown later, provides an isolated coupling means.

It has been discovered that reverse operation of the airfoil pickoff, i.e., instead of having the airfoil receive fluid, fluid is forced into the stream through the static pressure pickoffs on the airfoil, improves the overall performance of the airfoil pickoff. The impedance matching means thus includes a plurality of enclosed fluid passages, each one connecting one of the output ports of the pickoff means to a control means of a fluid amplifier, the enclosed fluid passages each having a fluid conduit connected to a source of fluid intermediate of the output ports, and control means. Each of the fluid conduits have a fluid resistance means located therein, the impedance matching means serving to substantially eliminate the attenuation of the signal between the output passages of the vortex rate sensor and the fluid amplifier.

For a better understanding of the invention, reference may be had to the following detailed description taken in conjunction with the accompanying figures of the drawing, in which.

Figure 1:
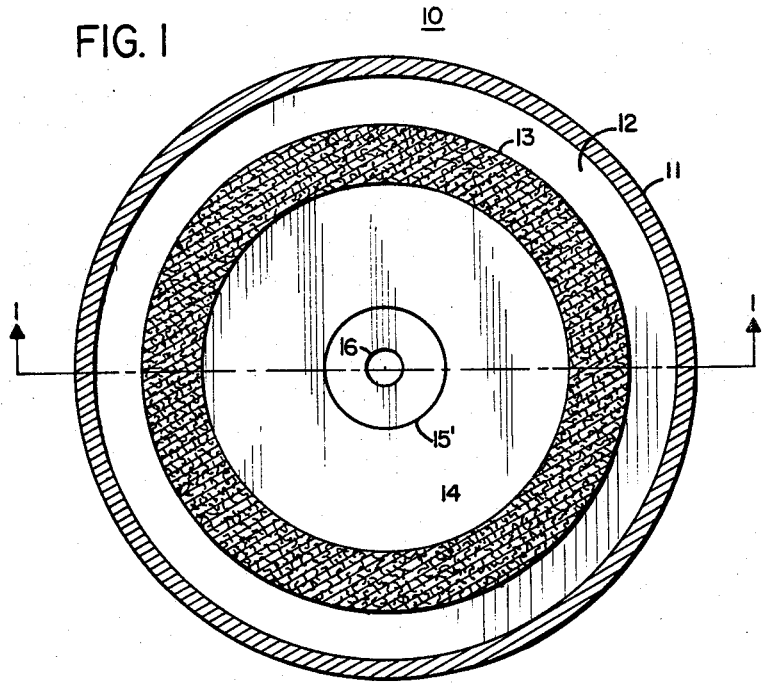
FIGURE 1 is a top view of one embodiment of a vortex rate sensor.
Figure 2:
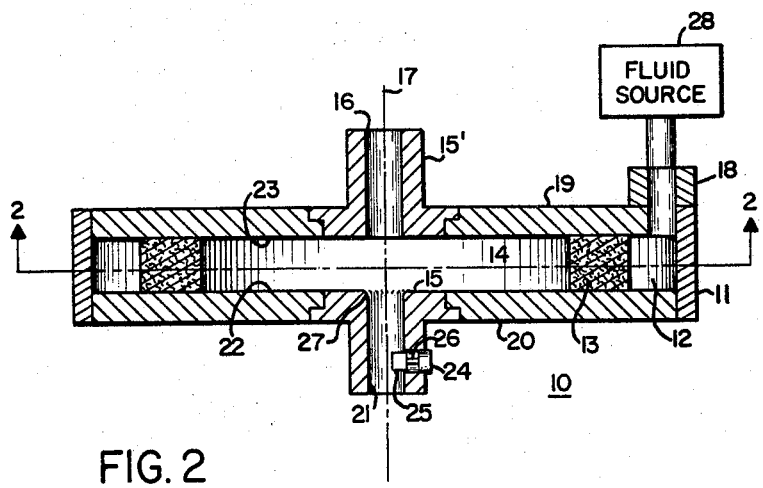
FIGURE 2 is a cross-sectional view taken along line 1—1 of FIGURE 1.

Referring to FIGURES 1 and 2, reference numeral 10 generally depicts a vortex rate sensor. A cylindrical tubular element 11 is provided to form an outer boundary of the vortex rate sensor. Immediately adjacent to element 11 is an annular or ringlike manifold 12, which serves to disperse the fluid uniformly around the periphery of the vortex rate sensor 10. A ring-shaped or annular sintered porous coupling means 13 forms inner boundary of the manifold 12. Thus, the cylindrical tubular element and the porous coupling means 13 serve to collectively define the radial boundaries of manifold 12. In the central portion of the vortex rate sensor 10, is located a round disc-like vortex rate chamber 14, which has its outer boundary defined by porous coupling means 13. Centrally located in the vortex rate sensor 10 are sink exit members 15 and 15'. Located centrally within sink exit members 15 and 15' is a cylindrical sink aperture of circular cross-section therethrough, as indicated by reference numerals 16 and 21.

Referring to FIGURE 2, reference numeral 17 depicts the axis about which angular rate is sensed. Fluid enters annular or ring-like manifold 12 through a circular ring-like or annular ingress 18 which is immediately adjacent to and connected to a fluid source 28. The circular ingress 18 is attached to a flat cylindrical circular plate element 19 which serves to define the top boundary of the vortex rate sensor 10. Similarly, a flat cylindrical circular plate 20 defines the bottom boundary of the vortex rate sensor 10. The two boundary elements 19 and 20 have circular plane surfaces 23 and 22 located respectively. Thus, the boundaries of vortex rate chamber 14 are defined collectively by the flat cylindrical circular plate elements 19 and 20 and by porous coupling means 13 in the radial direction.

FIGURE 2 shows a vortex rate sensor with a first exit passage 16 and a second exit passage 21, however, it is not necessary for operation of the device to have two outlet passages. That is, one exit passage 21 would be sufficient, and all fluids could exit through cylindrical bore 21. Referring to exit passage 21, there is a blade element 25 with a cross-sectional area of the classical streamline airfoil, or, more commonly referred to as, tear-drop shape. Blade elements 25 is situated parallel to axis 17 of the rate sensor and the leading edge of the blade element is faced inward toward vortex rate chamber 14. Reference numeral 24 generally depicts the signal pickoff in its entirety. Included within pickoff means 24 is a pair of circular static pressure ports 26, only one of which is shown in FIGURE 2, the other being situated on the other side of the blade element 25. Fluid particles flow from fluid source 28, through ingress 18, into annular manifold 12, and are dispersed uniformly around porous coupling media 13. The fluid particles then flow radially through porous coupling means 13 into vortex rate chamber 14 and converge in the central core region of the rate sensor. Upon convergence in the central core region of the vortex rate sensor, the fluid particles must change direction of travel and flow perpendicular to the radial direction and parallel to axis 17 and exit passages 16 and 21. This type of flow pattern is similar to the classical sink flow. When a rate is applied to the vortex rate sensor, the fluid particles leave porous coupling means 13 with an imparted tangential velocity and follow a logarithmic spiral into the central core region of the vortex rate sensor. From the central core region of the vortex rate sensor, the fluid particles travel out the exit passages 16 and 21 in a helical flow pattern.

Figure 3:
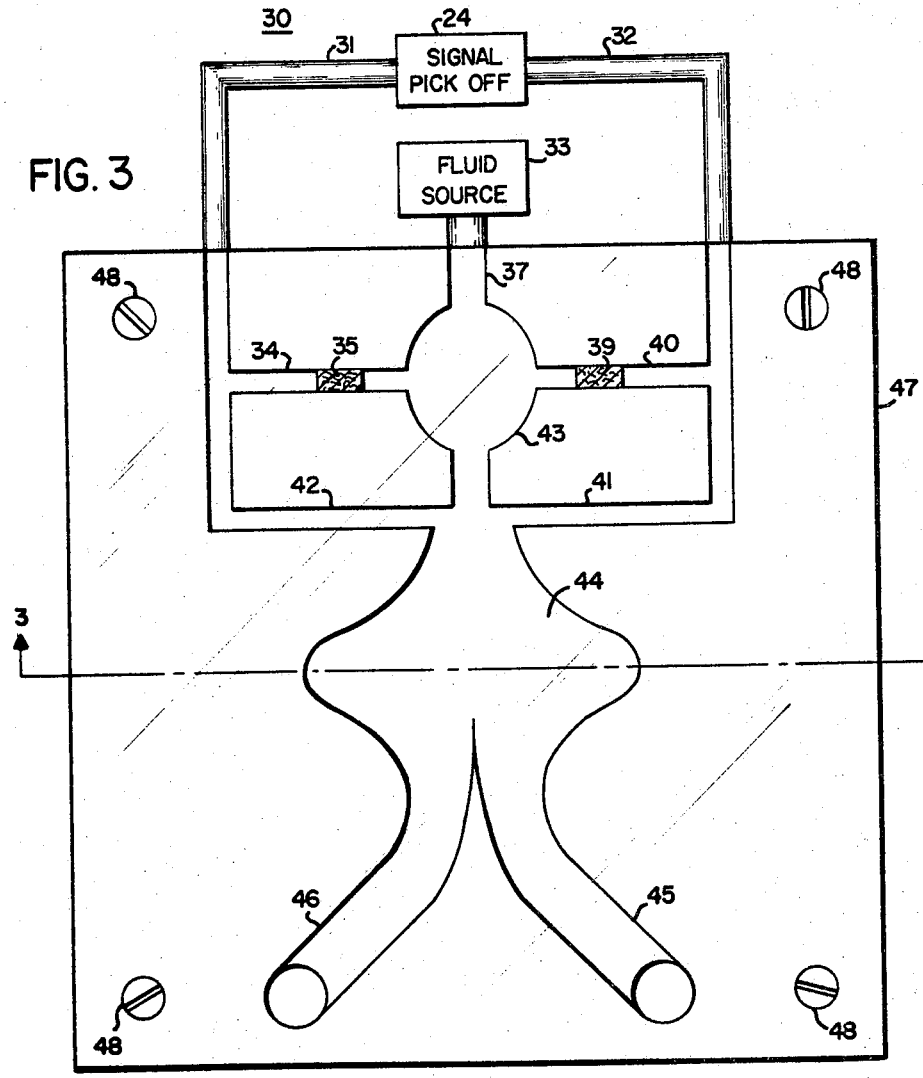
FIGURE 3 is a top view of a fluid amplifier connected to pickoff means of a vortex rate sensor.

Referring now to FIGURE 3 reference numeral 30 generally depicts a proportional momentum type fluid amplifier. For the purpose of this specification numeral 41 denotes the right fluid amplifier control port for deflecting the fluid stream and numeral 42 denotes the left fluid amplifier control port. The interaction region of the fluid amplifier is depicted by reference numeral 44 and derives its name from the fact that the fluid streams emanating from the control ports of the fluid amplifier interact with the fluid flowing from the power nozzle in this area. Reference numeral 45 depicts the right output leg of the fluid amplifier and 46 depicts the left output leg.

Two cylindrical passages 31 and 32 connect ports 26 of pickoff 24 to the fluid amplifier control means 41 and 42. Fluid power source 33 connects to fluid amplifier power nozzle 43 by means of a fluid conduit 37. A fluid passage 34 connects fluid conduit 37 with one of the exit passages 31 from the signal pickoff 24. Located within duct 34 is a porous sintered metal fluid resistive means 35. On the right side of the diagram is similarly located a fluid passage 40 which has also a porous sintered metal fluid resistive means 39 located within it.

Figure 4:
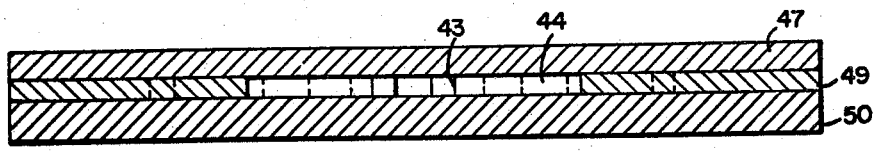
FIGURE 4 is a cross-sectional view taken along line 3—3 of FIGURE 3.

Referring to FIGURES 3 and 4, a transparent coverplate 47 is located immediately adjacent the fluid amplifier housing 49 and is fastened to fluid amplifier back coverplate 50 by means of screws 48. The material the fluid amplifier is fabricated from and the coverplates, both the front and back, are of no significance to this invention and can be made from any rigid material.

A typical use of a rate sensor and subsequent stages of amplification would be in a rate damper system for an aircraft. In actual flight, the rate sensor would sense the oscillations of the aircraft and send a signal through the subsequent stages of amplification to counteract the oscilations of the aircraft. The principle of operation of the vortex rate sensor remains the same whether applicant's invention is or is not used to impedance match the rate sensor to a subsequent stage of amplification. However, the signal pickoff operation is entirely different than with conventional impedance matching of two devices. To illustrate the difference between the prior art and applicant's invention, the operation will be described for both the conventional impedance matching and applicant's unique impedance matching apparatus.

First will be considered the conventional method of impedance matching a rate sensor to a fluid amplifier. As described previously in the specification, fluid flows radially inward from the porous coupling means and exits out the outlet passage when no rate is applied to the rate sensor. When the sensor is turned about its input axis, the flow streamlines from the inside face of the porous ring to the sink hole follow a spiral path. As the spiral tightens toward the center of the rate sensor, the flow velocity along the streamlines increases in order to conserve the angular momentum of the fluid. With an applied rate the flow exiting out the exit passage of the vortex rate sensor flows in a helical pattern. That is, the fluid has a component of velocity which is perpendicular to axis 17 of the vortex rate sensor.

Airfoil pickoff ports sense the pressure differential across both sides of airfoil 24. Although an airfoil pickoff is shown, a Pitot tube pickoff or tubular element with slits in it could also be used to sense a pressure signal. The airfoil signal pickoff measures the static pressure of the fluid stream on each side of the airfoil. The static pressure of the fluid stream varies with the angle of incidence of the fluid velocity vector on the airfoil. With a symmetrical airfoil and fluid flowing past the airfoil at zero angle of incidence, the streamlines of the fluid flowing around the airfoil will have a symmetrical pattern and be of equal length. Therefore, according to Bernoulli's equation the pressure differential across the airfoil will be zero.

If the direction of the fluid stream is changed by applying a rate to the sensor the fluid stream now approaches the airfoil at an angle of incidence which is not zero, that is, the velocity vector of the fluid stream is not parallel to the plane of the airfoil. The resulting streamlines around the airfoil are not symmetrical. Fluid particles thus will tend to accelerate on the longer streamlines and decelerate on the shorter streamlines. The difference in velocities then, according to Bernoulli, will give rise to a differential pressure across the airfoil.

Thus, with classical sink flow the fluid flows parallel to the airfoil and does not give rise to any pressure differential across the airfoil. With an input rate applied to the vortex rate sensor, a pressure differential signal will be detected across the airfoil, which is indicative of the applied rate to the vortex rate sensor.

The signal from the rate sensor is used to drive a subsequent stage of amplification. In order to drive a subsequent stage of amplification, the impedance of the signal pickoff and the fluid amplifier must be matched so as to make an operable combination. The normal impedance matching of rate sensor 10 to fluid amplifier 30 would require matching the available fluid from the signal pickoff with the required control flow for the fluid amplifier. However, when fluid is drawn through the static pressure taps of the airfoil signal pickoff, the pressure of the stream decreases. The pressure signal sensed by the airfoil signal pickoff is the static pressure of the fluid exiting out the egress or exit 21 of the vortex rate sensor. The static pressure in the signal pickoff port, however, appears as a stagnation pressure to subsequent stages of amplification. This is so because the velocity of the fluid in the static pressure port 26 is zero, and hence, there is no velocity head. In order to transmit the pressure signal from signal pickoff 24 to a subsequent stage of amplification, flow must be drawn from the static pressure port of the airfoil. The drawing off of fluid immediately begins to decrease the pressure in pressure port 26 of the signal pickoff for two reasons, first, the fluid pressure decreases as the velocity increases (Bernoulli's equation), and secondly the amount of flow that is able to be drawn into static pressure port 26 is limited because of the geometric size of the static pressure port. Therefore, with a small amount of flow drawn from the signal pickoff, there will be an attenuation of the available pressure signal, which is an undesirable situation since the gain of the system is impaired.

The applicant has a unique apparatus for impedance matching the rate sensor to the subsequent stage of amplification, which is shown in FIGURE 3. The control ports of the fluid amplifier 30 are denoted by reference numerals 41 and 42. These two control ports control the direction of the fluid stream emanating from power nozzle 43. The present invention is not limited to a fluid amplifier of this type and other types of fluid amplifiers, for example, a turbulence or vortex amplifier may be used.

To control the power stream emanating from power nozzle 43, fluid must be supplied to the control ports 41 and 42. Normally, this fluid would be supplied by the signal pickoff 24. In the applicant's invention, control ports 41 and 42 are connected to the fluid source 33 so that a fluid is supplied to the signal pickoff 24. Resistive means 35 and 39 serve to reduce the pressure and limit flow in the lines 34 and 40 to prevent saturation of the fluid amplifier 30. Fuid flows in a normal direction into the control ports and 41 and 42, however, the signal pickoff is now receiving fluid rather than supplying fluid. The signal pickoff, thus, instead of being a source of fluid of varying strength, is now a sink of fluid of varying strength.

The fluid leaving the resistive means 35 divides inversely according to the amount of resistance it receives in the signal pickoff and the control port of the amplifier. That is, if there is a high pressure in the signal pickoff, most of the fluid will flow into the fluid amplifier control port, and conversely, if there is a low pressure in the signal pickoff port, most of the fluid will flow there. Generally for fluids the rate of flow between two fluid states is directly proportional to the pressure differential between these two fluid states, hence, with the present invention the amount of fluid flowing into the signal pickoff depends on the pressure in the signal pickoff 24. The advantageous aspect of applicant's invention is that there is substantially no signal attenuation between the vortex rate sensor and the subsequent stage of amplification. The reason being that a small amount of fluid is more readily absorbed by a large stream without changes in the fluid velocity of the large stream, and consequently, giving rise to pressure changes.

With the present invention the problem of impedance matching is susbtantially simplified and individual matching of the characteristics of the signal pickoff to the fluid amplifier are eliminated.

Although the present invention for impedance matching was applied to a vortex rate sensor and a fluid amplifier, it is by no means limited to impedance matching of these types of fluid devices.

While I have shown and described specific embodiments of this invention, further modifications and improvements will occur to those skilled in the art. I desire it to be understood, therefore, that this invention is not limited to the particular forms shown and I intend in the appended claims to cover all modifications which do not depart from the spirit and scope of the invention.

I claim:
1. An apparatus of the class described comprising:
    a vortex rate sensor having airfoil pickoff means including a first and a second fluid passage;
    a fluid amplifier having a first and a second fluid control port, the output of said fluid amplifier being controlled by the flow of fluid through said first and second fluid control ports; and
    impedance matching means, said impedance matching means including first fluid conductor means connecting said first fluid passage to said first control port, said first fluid conductor means having a first fluid conductor means having a first conduit connected thereto, said first conduit having fluid resistance means to limit the flow of fluid therethrough, said first conduit being adapted to be connected to a fluid source which is at a pressure greater than the pressure signals produced by said pickoff means, second fluid conductor means connecting said second fluid passage to said second control port, said second fluid conductor means having a second conduit connected thereto, said second conduit having fluid resistance means to limit the flow of fluid therethrough, said second conduit being adapted to be connected to a fluid source which is at a pressure greater than the pressure signals produced by said pickoff means, said impedance matching means functioning to substantially eliminate the attenuation of the fluid signal between said vortex rate sensor and said fluid amplifier by virtue of the pickoff means operating as a fluid sink.

2. An apparatus of the class described comprising:
    a vortex rate sensor having pickoff means including a first and a second fluid passage, said sensor producing pressure signals at the first and second fluid passages which vary in opposite senses with changes of rate sensed;
    a fluid amplifier having a first and a second fluid control port, the output of said fluid amplifier being controlled by the flow of fluid through said first and second fluid control ports; and
    impedance matching means, said impedance matching means including a first fluid conductor means connecting said first fluid passage to said first control port, said first fluid conductor means having a first conduit connected thereto, said first conduit having a fluid resistance means to limit the flow of fluid therethrough, said first conduit being connected to a fluid source which is at a pressure greater than the pressure signals produced by said rate sensor, whereby the fluid flows from the fluid source through said first conduit and into said pickoff means, second fluid conductor means connecting said second fluid passage to said second control port, said second fluid conductor means having a second conduit connected thereto, said second conduit having a fluid resistance means to limit the flow of fluid therethrough, said second conduit being connected to a fluid source which is at a pressure greater than the pressure signals produced by said rate sensor, whereby the fluid flows from the fluid source through said second conduit and into said pickoff means, said impedance matching means functioning to substantially eliminate the attenuation of the fluid signal between said vortex rate sensor and said fluid amplifier.

3. An apparatus of the class described comprising:
    condition responsive means having pickoff means, said pickoff means having first and second pressure ports located therein said condition responsive means developing pressure signals at the first and second ports each of which varies with the condition;

fluid amplifier means having control means responsive to fluid input signals for producing a fluid output signal; and impedance matching means including first and second fluid passages, said first and second fluid passages connecting said first and second pressure ports respectively to said control means of said fluid amplifier means, said first and second fluid passages each having a conduit connected thereto, each conduit having fluid flow limiting means, each conduit adapted to be connected to a fluid source which is at a pressure greater than the pressure signal produced by said pickoff means, said impedance matching means being operable to substantially eliminate attenuation of the signal between said condition responsive means and said fluid amplifier means.

4. An apparatus of the class described comprising:

a fluid vortex rate sensor having pickoff means therein, said pickoff means having a pressure port therein at which a pressure signal is developed which varies with the rate sensed;

a fluid amplifier having control means responsive to a fluid input signal for producing a fluid output signal; and impedance matching means including passage means connecting said pickoff means to said control means, further means connected to said passage means, said further means having flow limiting fluid resistance means, said further means being adapted to be connected to a fluid source which is at a pressure greater than the pressure signal produced by said pickoff means, said impedance matching means functioning to substantially reduce signal attenuation between said fluid vortex rate sensor and said fluid amplifier.

5. An apparatus of the class described comprising:

fluid apparatus having pickoff means therein, said pickoff means having a pressure port therein at which a pressure signal is developed which varies through a range of values with a condition;

a fluid amplifier having control means responsive to a fluid input signal for producing a fluid output signal; and impedance matching means including a passage connected at one end to said pressure port, the other end of said passage having a first branch and a second branch, said first branch being connected to a fluid conduit, said fluid conduit limiting the fluid flow therethrough, said fluid conduit being adapted to be connected to a fluid source which is at a pressure greater than the pressure signals produced by said pickoff means, said second branch being connected to said control means of said fluid amplifier, said impedance matching means functioning to substantially reduce signal attenuation between said fluid apparatus and said fluid amplifier.

6. In a fluid system that includes a fluid amplifier having a control port, a device for developing a pressure signal at an output port thereof which is of magnitude that varies through a range of values with variations of a condition, and fluid conducting means connected to the output port of the device and the control port of the fluid amplifier so that the pressure signal is operable to control the fluid amplifier in accordance with the condition, the improvement comprising:

means for reducing pressure and limiting flow having a first end for connection to a source of fluid under a pressure greater than any pressure signal normally developed at the output port of the device and a second end connected to the fluid conducting means said means operating to conduct a flow of fluid into the fluid conducting means a first portion of which flows into the output port of the device and the remainder of which flows to the control port of the fluid amplifier, the magnitude of the first portion varying inversely with the magnitude of the pressure signal and the magnitude of the remainder varying inversely with the magnitude of the first portion and thus directly with the magnitude of the pressure signal.

References Cited

UNITED STATES PATENTS 3,191,858   6/1965   Sowers _____ 137—81.5 X
3,216,439  11/1965   Manion _____ 137—81.5

JAMES J. GILL, *Primary Examiner.*

BENJAMIN A. BORCHELT, *Examiner.*

W. C. ROCH, *Assistant Examiner.*